United States Patent [19]
Maltby

[11] 3,746,975
[45] July 17, 1973

[54] MEASURING CHARACTERISTICS OF MATERIALS BY USING SUSCEPTIVE AND CONDUCTIVE COMPONENTS OF ADMITTANCE

[75] Inventor: Frederick L. Maltby, Jenkintown, Pa.

[73] Assignee: Drexelbrook Controls, Inc., Horsham, Pa.

[22] Filed: Aug. 20, 1971

[21] Appl. No.: 173,538

[52] U.S. Cl............ 324/65 R, 73/304 C, 324/61 R
[51] Int. Cl............................................. G01r 27/02
[58] Field of Search....................... 324/65 R, 61 R; 73/304 C

[56] References Cited
UNITED STATES PATENTS
2,008,046  7/1935  Snelling.............................. 324/65 R
3,566,259  2/1971  Wilson................................. 324/61 R

FOREIGN PATENTS OR APPLICATIONS
911,975  12/1962  Great Britain..................... 324/65 R
295,025  10/1969  Australia............................ 324/65 R
404,208  6/1970  Australia............................ 324/65 R

Primary Examiner—Stanley T. Krawczewicz
Attorney—Thomas M. Ferrill, Jr. and Allen V. Hazeltine

[57] ABSTRACT

A system for measuring a condition of a material using an admittance probe or probes which are immersed in or placed in proximity to the material, in which both the susceptive and conductive components of admittance exhibited by the probes are utilized to provide measurements of the desired characteristic which are substantially free from errors due to variations in other characteristics of the materials.

14 Claims, 14 Drawing Figures

INVENTOR.
FREDERICK L. MALTBY
BY
ATTORNEY

INVENTOR.
FREDERICK L. MALTBY
BY
ATTORNEY

MEASURING CHARACTERISTICS OF MATERIALS BY USING SUSCEPTIVE AND CONDUCTIVE COMPONENTS OF ADMITTANCE

This invention relates to improvements in apparatus for measuring various characteristics of materials.

For example, it is known to make measurments of the weight of granular material by observing the susceptance exhibited by a probe immersed in the material whose weight is to be measured. However, the accuracy of such measurements has been subject to substantial errors because of moisture associated with the material to be measured which causes the probe susceptance to vary not only as function of the dry weight of the material but also as a function of the moisture associated therewith. Also it has been observed that the probe exhibits a conductive component which varies as a function of the moisture content of the material in which the probe is immersed. In some instances the conductance will vary as a function of the moisture content in accordance with substantially the same mathematical relationship as the susceptance, while in other instances it will vary in accordance with a substantially different relationship. I have determined that in either event it is possible to operate on the conductance in such a manner as to produce a quantity which, when subtracted from the susceptance, will yield a quantity which is substantially independent of variations in moisture content and which is representative substantially only of variations in the dry weight of the material being measured. Further, since the quantity produced by operating on the conductance is directly representative of variation in the moisture content, it may be divided by the quantity representative of the dry weight to yield a quantity representative of variations in the percentage moisture content of the material being measured.

In accordance with the invention there are provided means for measuring both he susceptive and the conductive components exhibited by a probe immersed in material whose dry weight is to be measured. If the two quantities vary in accordance with substantially the same mathematical relationship they are supplied directly to a differential amplifier or other suitable subtracting circuit, at the output of which is produced a quantity which will be directly representative of variations in dry weight of the material and independent of variation in moisture content.

If the two quantities derived from the measurements vary in accordance with different mathematical relationships, a quantity representative of the ratio of conductance to susceptance is produced and is supplied to a suitable non-linear amplifier or function genrator adapted to modify it and produce a quantity varying in accordance with substantially the same mathematical relationship as the susceptive component. Then the susceptive component and the quantity representative of the modified ratio of the two components are supplied to the differential amplifier, at the output of which is produced a quantity representative of variations in dry weight.

In the first case, if desired, the modified quantity representative of the conductive component and the output of the differential amplifier, representative of dry weight, may be supplied to a conventional divider circuit to produce at its output a quantity representative of percentage moisture content.

In the second case a quantity representative of the ratio can be supplied to an amplifier to produce at its output a quantity representative of the precent moisture content.

Another example of the applicability of the invention relates to the measurement of conductivity between spaced points of a coating of conductive material immediately after it has been applied to a relatively non-conductive substrate. Here it is not feasible to measure the conductivity of the coating by probes directly contacting the coating because it is still moist and sticky and would be disturbed by such probes. I have found that it is possible to make such measurements using spaced capacitive electrodes positioned in proximity to the substrate on the uncoated side thereof, by deriving signals representative of the susceptive and conductive components of the admittance exhibited by such electrodes, and by operating on said signals to produce a signal which is representative of the ocnductivity of the coating and which is independent of variations in the thickness of the substrate.

Yet another example of the applicability of the invention relates to the measurement of level of conducting material in a vessel by an immersion probe where the conducting material tends to produce a coating to a level higher than the actual level of the liquid. In this case the coating produces an increase in both the susceptance and the conductance measured between the probe and the grounded vessel. When the coating is relatively long, and thus would produce appreciable error, the increase in conductance is equal to the increase in susceptance. In this case I have found that it is possible by subtracting the conductance from the susceptance to produce a resulting quantity which will be representative of the true level of the liquid.

While the foregoing represent typical examples of the manner in which certain characteristics of materials may be measured in accordance with the present invention, it will be understood that numerous other characteristics may be measured utilizing the principles of the invention in ways which will be apparent to those skilled in the art in view of the disclosure contained herein.

Accordingly it is an object of the invention to provide improved apparatus for measuring various characteristics of materials.

More particularly, it is an object of the invention to provide apparatus for measuring certain characteristics of materials while avoiding errors in such measurements due to variations in other characteristics thereof.

Further it is an object of the invention to provide apparatus using admittance probes to measure certain characteristics of materials, in which both the susceptive and the conductive components of admittance exhibited by the probes are utilized to provide measurements of said material which are substantially free from errors due to variations in other characteristics of the materials.

Another object of the invention is to provide apparatus for measuring the dry weight of granular material independently of variations in its moisture content and also for measuring the percentage moisture content of such material.

Another object of the invention is to provide means for measuring the conductivity between spaced points of a conductive material applied to the surface of a relatively non-conductive substrate.

Another object of the invention is to provide means for measuring a true liquid level by an immersion probe without errors due to the conducting films on the probe.

The invention will be more fully understood from consideration of the following detailed description thereof with reference to the drawings, in which:

Figure 1:
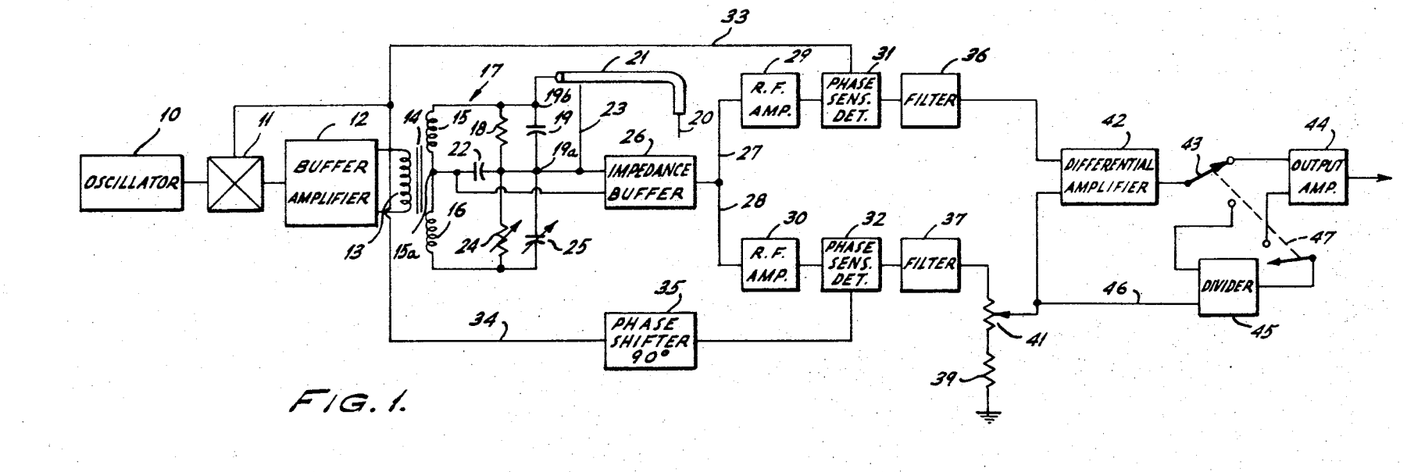
FIG. 1 is a block diagram illustrating one form of the invention.

Referring to FIG. 1, the output of an oscillator 10, designed to operate at a frequency of, for example, 200 khz., is supplied through a combining circuit 11 to the input of a buffer amplifier 12 having a high gain — e.g., well in excess of 1,000. The output of amplifier 12 is fed back to combiner 11 and combined with the output from oscillator 10 to provide substantially 100 percent negative feedback to provide a highly stable low impedance source of alternating high frequency signal at the output of amplifier 12, which is connected to the primary winding 13 of transformer 14. The two halves 15 and 16 of the secondary winding of transformer 14 respectively form two adjacent arms of a bridge circuit 17. One of the remaining two arms of the bridge comprises the parallel combination of resistor 18 and capacitor 19 representing respectively the conductive and susceptive components of admittance exhibited by a probe 20 adapted for immersion in a material whose weight is to be measured, said probe being connected to the upper terminal of the upper half 15 of the transformer secondary winding through a coaxial cable 21 having its outer conductor connected through connection 23 to point 19a. The other arm of the bridge comprises the parallel combination of variable resistor 24 and variable capacitor 25. The output of the bridge circuit is developed across a capacitor 22 connected between the junction 15a of the two halves 15 and 16 of the transformer secondary winding and point 19a. This output is supplied to the input of an impedance buffer amplifier 26, the output of which is supplied through connections 27 and 28 respectively to the input of R.F. amplifiers 29 and 30, both of which may have provisions for adjusting their respective gains. The outputs of said amplifiers are supplied respectively to the inputs of phase sensitive detectors 31 and 32. Detector 31 also is supplied through connection 33 with an in-phase signal from the output of buffer amplifier 12, and detector 32 is supplied through connection 34 and phase shifter 35 with a quadrature-phased signal from the output of buffer amplifier 12. Detector 31 operates to develop an output proportional to the susceptive component of the admittance exhibited by probe 20, and detector 32 operates to develop an output proportional to the conductive component of the same admittance. The respective outputs of detectors 31 and 32 are filtered in low pass filters 36 and 37 to produce substantially d-c voltages. The output of filter 37 is supplied to the input of a variable voltage divider circuit which consists of a potentiometer 41 connected in series with a resistor 39 which has its other end connected to the circuit common. The center arm of the potentiometer 41 is the output of the variable voltage divider. Both the output of the variable voltage divider and the output of the low pass filter 36 are supplied to the input of a differential amplifier 42, the output of which is connectable by a switch 43 either to the input of an output d-c amplifier 44 or to the input of a divider 45. There is also a connection 46 from the output of the variable voltage divider to the input of divider 45. By means of switch 47 the output of divider 45 may be connected to or disconnected from the input of amplifier 44 as will be discussed later. The output of amplifier 44 may be observed and measured by a meter or other suitable means (not shown) or may be used in any desired manner to exert a controlling effect.

The apparatus shown in FIG. 1 up to and including phase sensitive detectors 31 and 32 is essentially similar to that described in my copending application Ser. No. 146,269, filed May 24, 1971 (transmitted to the Patent Office May 20, 1971) for Condition Measuring System and operates in essentially the same manner and for the same purpose, except that in the present arrangement separate phase detectors 31 and 32 are provided for developing separate outputs respectively representative of the susceptive and conductive components of admittance exhibited by the probe 20, whereas in the arrangement of the former application only an output representative of the susceptive component was developed. Briefly, in the present arrangement, oscillator 10, combiner 11, and buffer amplifier 12 cooperate, as in the former arrangement, to provide a highly stable, low impedance source of high frequency signal for supply to the bridge circuit 17 whose voltage does not vary apreciably even though the conductance exhibited by probe 20 may become quite large. As in the former arrangement, the impedance presented by capacitor 22, across which the bridge output is developed, is made much lower than that exhibited by probe 20 so that there will be produced across it quadrature components representative respectively of the susceptive and resistive components exhibited by the probe. Detector 31, supplied with an in-phase component of the output from buffer amplifier 12, produces an output representative of the susceptive component of the probe admittance, whereas detectpr 32, supplied with a ninety degree out-of-phase component of the buffer amplifier output, produces an output representative of the conductive component of the probe admittance. As pointed out in my copending application above identified, the impedance buffer 26 may comprise a highly stable amplifier having a high impedance input.

The impedance presented by capacitor 22 is preferably small and of stable phase angle. This can be either a physical element or may be a reflected or virtual impedance. For example it could be provided by a transformer primary connected in place of capacitor 22. In this case if the secondary was unloaded, the primary inductive reactance would constitute the impedance. If the transformer secondary were heavily loaded, the impedance reflected into the primary would constitute the impedance. Similarly, if the input of a high gain amplifier having a current feedback were connected in place of 22, the virtual input impedance of the amplifier with feedback would constitute the impedance.

Figure 2:
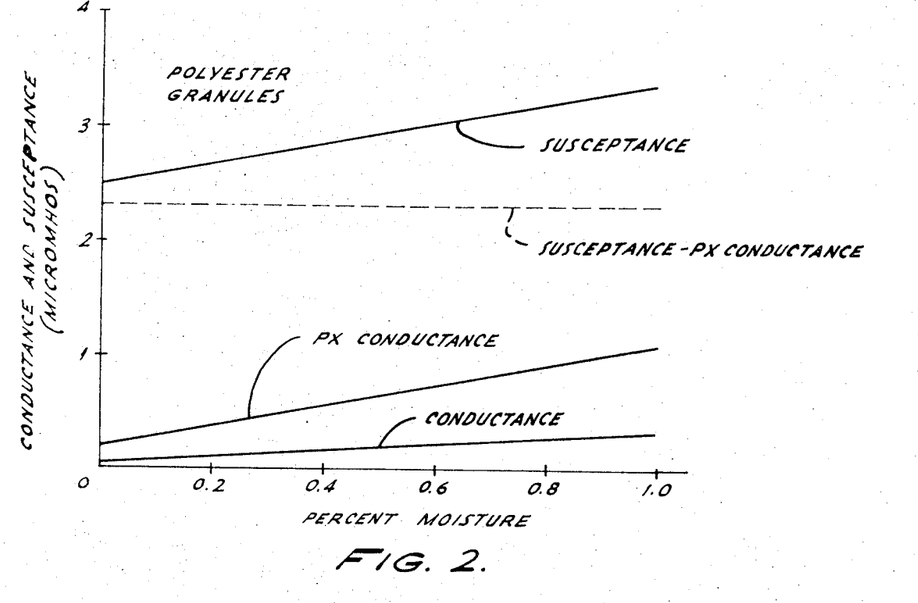
FIGS. 2, 3 and 4 are graphs which will be referred to in explaining the operation of the embodiments of FIG. 1 and 1A.

For a better understanding of the operation of the remainder of the arrangement of FIG. 1 reference will be made first to the graph of FIG. 2. This shows plots of susceptance and conductance as exhibited by the probe versus percent moisture content for polyester granules having different amounts of moisture associated therewith. Susceptance varies over a range of about 1.34 to 1 for a variation from 0 to 1 percent mositure content. Clearly, under such circumstances, the susceptance component exhibited by the probe cannot be relied on to give a satisfactory indication of the dry weight of the polyester granules. However, it will be noted that the conductance curve is of substantially the same form as the susceptance curve, and that if it is multiplied by an appropriate constant (P) and the resulting curve ( P × conductance) is subtracted from the susceptance curve, there will be obtained a curve of susceptance minus P times conductance which is substantially independent of variations in moisture content. In particular, for a variation in moisture from 0 to 1 percent, the difference curve varies less than 1 percent. Accordingly, by taking the difference between susceptance and P times conductance, a quantity can be obtained which is representative of dry weight of the particles with an accuracy of better than 1 percent.

This may be accomplished in the arrangement of FIG. 1. The output of filter 36 corresponds to the signal represented by the susceptance curve of FIG. 2. With appropriate gain settings (scale factors) of the R.F. amplifier 30, the potentiometer 41 in the variable voltage divider can be calibrated in "P", such that the output of the variable voltage divider corresponds to the signal represented by the P times conductance curve of FIG. 2. Both the output signals represented by the susceptance and P times conductance curves of FIG. 2 are supplied directly to the input of differential amplifier 42, the output of which will correspond to the susceptance minus P times conductance curve of FIG. 2 and will be representative of dry weight of the polyester granules in which the probe is immersed. Switch 43 therefore is positioned upward to supply the output of differential amplifier 42 directly to the input of output amplifier 44, and switch 47, which may be ganged to switch 43 as shown, is positioned downward to disconnect the output of divider 45 from the input of amplifier 44.

While, as is evident from the foregoing, the arrangement described provides a substantial improvement in accuracy of measurement of dry weight under the particular circumstances shown in FIG. 2, it is possible to obtain similar improvement even under less favorable circumstances as will be explained later.

Figure 3:
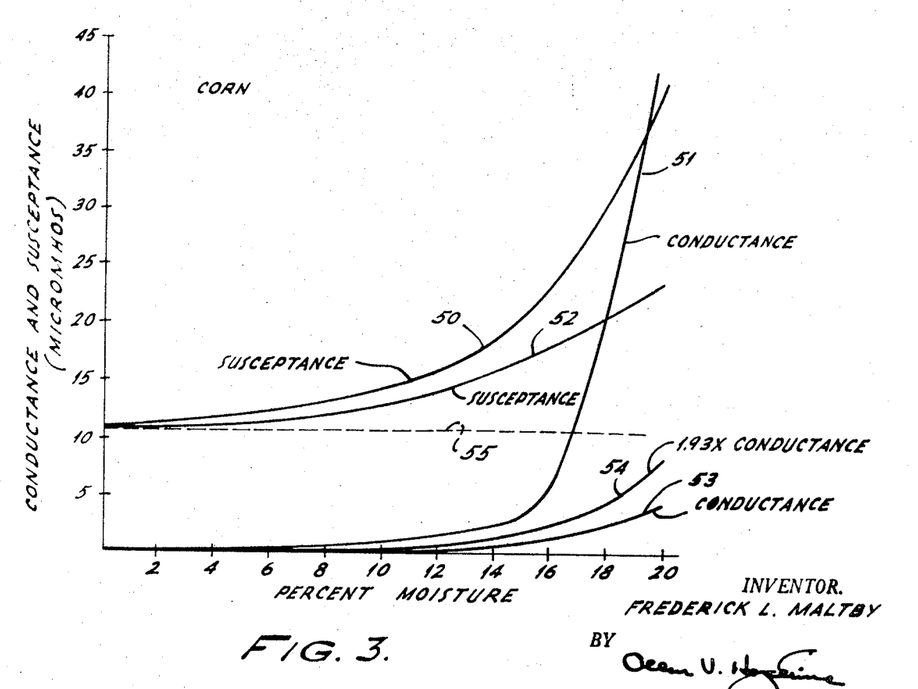

Referring now to FIG. 3 curves 50 and 51 represent respectively plots of susceptance and conductance versus percent moisture for corn. It will be observed that the two curves, unlike those of FIG. 2, are substantially different in form and therefore it is not feasible to subtract them directly to obtain a curve which is substantially independent of variations in moisture over a wide range. This is because the water is actually absorbed into the corn and is not stratified as with the polyester granules. In accordance with the invention it still is possible to derive a quantity which is substantially independent of variations in moisture content. To do this, the form of the conductance curve is modified by putting a capacitor in series with the probe. The addition of the series capacitor will lower both the susceptance and the conductance curves as illustrated by curves 52 and 53 in FIG. 3. The effect will be greater on the conductance curve since the change in conductance is greater. It is possible, therefore, to select the correct value of the series capacitor which will "pull" the conductance curve down so that it will follow the susceptance curve with minimum error, as does the curve 54 designated 1.93 conductance in FIG. 2. Further it is noted that the correct value of the series capacitor to be used will depend on the amount of material present and being measured. As the level of the material changes, the value of the series capacitor needed for minimum error should also change. This objective can be achieved by using an insulated probe — e.g. one coated with teflon. Subtraction of curve 54 from curve 52 obtained in this manner yields the dotted curve 55 exhibiting very small variation with moisture content, and therefore providing an accurate indication of dry weight of the corn. This result is obtained using the arrangement of FIG. 1 in the same manner as described with reference to FIG. 2 except that an insulated probe is used and a capacitor of suitable magnitude is included in series with the probe.

There are two factors which affect the shape of the susceptance and conductance curves as seen by the instrument. First is the frequency of oscillation and second, the series capacity of the probe or the thickness of the insulation of the probe. Both factors may be adjusted to give the best fit between the conductance and susceptance curves and thereby minimize the error in the output. If for certain materials this method does not provide the accuracy needed, the arrangement of FIG. 1A may be used.

Figure 1A:
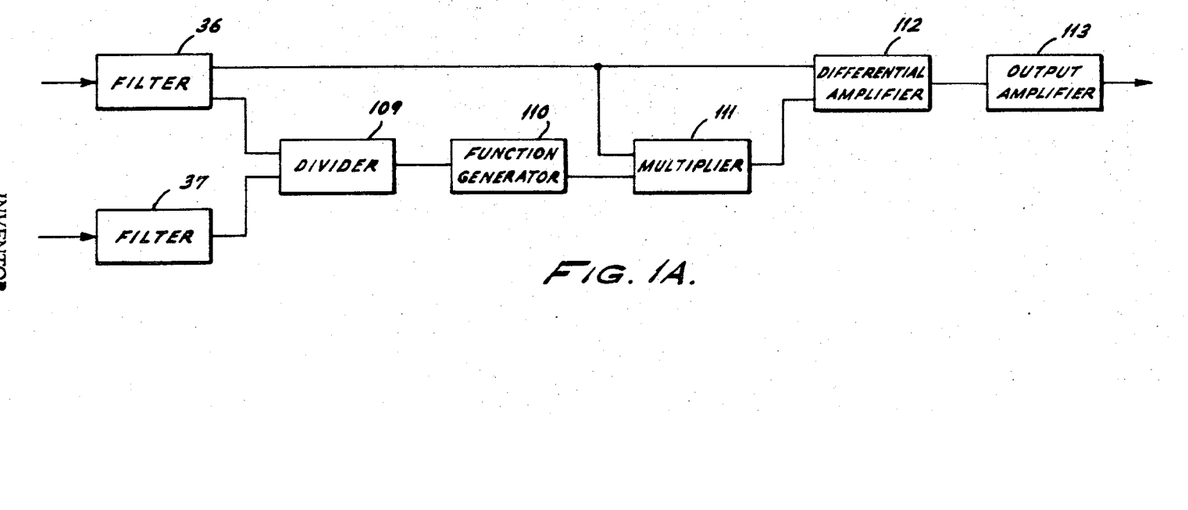
FIG. 1A is a block diagram illustrating a modification of the embodiment of FIG. 1.

FIG. 1A shows a modification of the system of FIG. 1 for achieving this result, the arrangement of FIG. 1A being substituted for the portion of the system of FIG. 1 beginning with filters 36 and 37. The outputs from filters 36 and 37, representing respectively the susceptive and conductive components, are supplied to the input of a divider circuit 109 which produces at its output a signal representative of the ratio of the conductive and susceptive components. This in turn is supplied to input of a function generator 110 for developing a signal proportional to the ratio of conductance and susceptance, which is supplied to multiplier 111 along with the susceptance component from the output of filter 36. The resultant product is subtracted from the susceptance component in differential amplifier 112 to yield an output which is independent of moisture and representative of dry weight. This output is amplified in output amplifier 113 and may be used in any desired manner.

Figure 4:
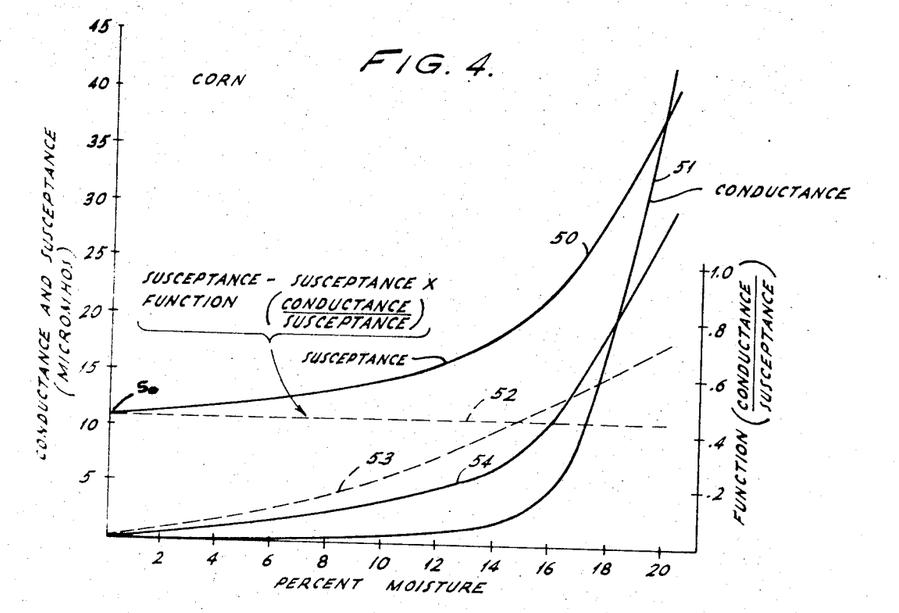

The manner in which this result is achieved will be seen from consideration of FIG. 4, where there are shown the same curves 50 and 51 of susceptance and conductance versus moisture content for corn as those of FIG. 3. The increase in the susceptance is a function of both the amount of material present and the percentage moisture. The ratio of conductance to susceptance on the other hand is a function of the percent moisture only. Thus if the appropriate function of the conductance to susceptance ratio times the susceptance is subtracted from the susceptance itself the result will be curve 52 which can be made independent of the precent moisture and dependent directly upon the dry weight of material provided the appropriate function is used in the function generator shown in the circuit given in FIG. 1A. The appropriate function for a given material can be derived. The output signal of the instrument is to be independent of moisture; consequently from the curves of FIG. 4 it is seen that the desired output signal is equal to the output representative of the susceptance of the material where moisture content is zero (So).

$$\text{Output} = S - Sf(G/S) = So$$

$$\text{Therefore } f(G/S) = 1 - So/S$$

For a given material the function can be found experimentally by determining the susceptance and conductance for a given sample of material for various amounts of moisture content. A curve representative of this function for corn is shown at 53 in FIG. 4, whose ordinates are numerical values according to the vertical scale at the right-hand side of the graph. Curve 54 in FIG. 4 shows the result of multiplying these ratios by susceptance for different values of per cent moisture.

Similar results, but with somewhat less precision, can be obtained using the arrangement of FIG. 1 in the following manner. In FIG. 1, if switch 43 is in its down position and switch 47 in its closed position, the output of the variable voltage divider 41 which is representative of the weight of water will be divided by the output of the differential amplifier 42 which represents the dry weight. The output of the divider 45 and the output of the output amplifier 44 will be representative of fraction of the water relative to the dry weight or, with appropriate scale factors, the percent of water to dry weight. If the water content is to be expressed as a percentage of total weight, the output of voltage divider 41 may be divided by the sum of the output of differential amplifier 42 and the output of voltage divider 41 in divider circuit 45 by appropriate changes in the inputs to circuit 45, as will be apparent.

In the arrangement of FIG. 1A, the function generator 110 may be of any suitable conventional form. For example it may be of the form shown in the Burr-Brown Research Corporation "Handbook and Catalog of Operational Amplifiers", LI-227, page 48, lower half, Copyright 1969. In this function generator, the operational amplifier A may be, for example, of the form shown in RCA Data Sheet File No. 360, issue dated Noember, 1968. Differential amplifier 112 may be of the form shown in the same Burr-Brown catalog above referred to, on page 41, identified as "Simple Circuit". Again in this circuit the operational amplifier A may be of the form shown in the RCA Data Sheet above identified. Divider 109 may be of the form shown in "The Microelectronics Data Book", Second Edition, December, 1969, Motorola Semiconductor Products, Inc., Section on Multipliers, Modulators and Detectors, Linear Four Quadrant Multiplier, MC1595L, FIG. 13.

Figure 5:
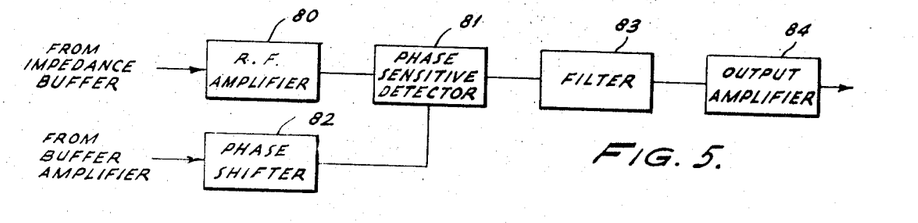
FIG. 5 is a block diagram illustrating a modification of the embodiment of FIG. 1.
Figure 5A:
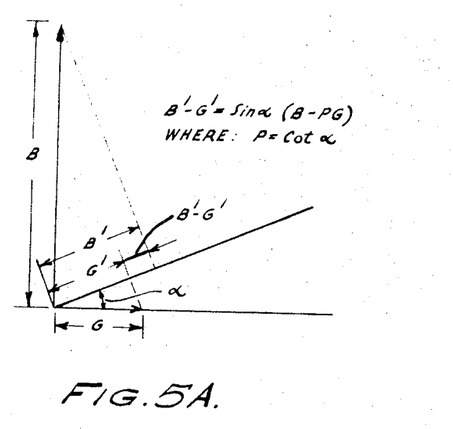
FIGS. 5A and 5B are vector diagrams which will be referred to in explaining the modification of FIG. 5.

Referring now to FIG. 5, there is shown a modification of the embodiment of FIG. 1 in which subtraction of the conductive and susceptive components of the bridge output is accomplished using a single phase-sensitive detector phased to detect at a specific angle selected to have a value between 0° and 90° as will be explained persently. The circuitry of FIG. 5 is substituted for all of that following the impedance buffer 26 in FIG. 1. It comprises an R.F. amplifier 80 supplied with the output from impedance buffer 26 of FIG. 1. The output of R.F. amplifier 80 is supplied to the input of phase sensitive detector 81 which also is supplied with a phase-shifted signal through phase shifter 82 whose input is supplied in phase with the output of buffer amplifier 12 of FIG. 1. The operation of phase detector 81 is explained with reference to FIG. 5A in which the susceptive and conductive components of the bridge output signal are represented by the vectors B and G respectively and the detector phase angle is $\alpha$. In operation the detector will produce a d.c. output proportional to the difference of the magnitudes of B' and G'. By appropriate selection of the angle $\alpha$ between the detecting phase and the conductive component G, the relative contribution of G can be made such that the d-c output of the detector is proportional to $|B| - P|G|$, where P is the appropriate constant and the output is representative of dry weight of the material measured. Thus, in FIG. 5A, it is observed that $B' = B \sin \alpha$ and $G' = G \cos \alpha$ where $\alpha$ is tha angle between the detecting phase and the conductive component G. The detected signal is $B' - G'$ but $$B' - G' = B \sin \alpha - G \cos \alpha$$

$$= \sin \alpha \, [B - \cot \alpha \times G]$$

Therefore the detected signal is proportional to $|B| - P|G|$ where $P = \cot \alpha$ and $\sin \alpha$ is the proportionality constant.

Figure 8:
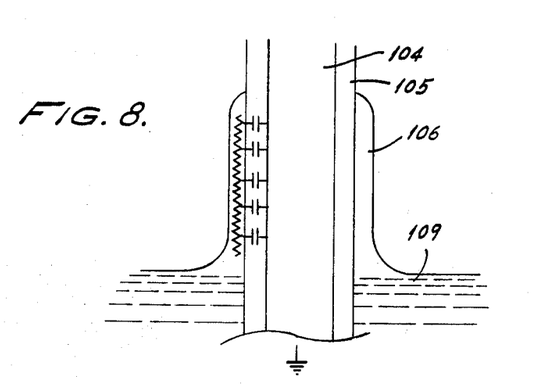
FIG. 8 is a diagram illustrating a condition which may be encountered in operation of the embodiment of FIG. 1.

Similarly, as will be seen later, an angle of 45° can be used for the measurement of FIG. 8 and 8A and the output will be representative of the true liquid level. As in the system of FIG. 1, the output of the detector may be supplied through filter 83 to an output d-c amplifier 84, the output of which may be used as desired.

Another representative application of the invention is in the coating of box board with a thin coating of clay to render it suitable for receiving printing inks and like materials. In this process clay in the form of a slurry is applied to box board in a continuous procedure to form a coating of only a few thousandths of an inch in thickness — very much thinner than the box board itself which may be as much as 40 times thicker than the clay coating. It is essential that the coating be as thin and uniform as possible to provide the desired surface for receiving ink, but thick enough to provide complete coverage and fill all depressions in the board surface. To this end it is desired to continuously monitor the thickness of the coating immediately following its processing and to control the coating machinery accordingly. The means used to monitor the coating thickness must do so without directly contacting the coated surface which is still moist and sticky. Prior known measurement methods, such as those involving nuclear techniques, are unsuitable for this purpose because they are subject to error due to variation in the thickness of the board stock itself. In accordance with the present invention means are provided for continuously monitoring the conductance of the coating between two spaced points as it passes continuously from the coating machinery without contacting the coated surface.

Figure 6:
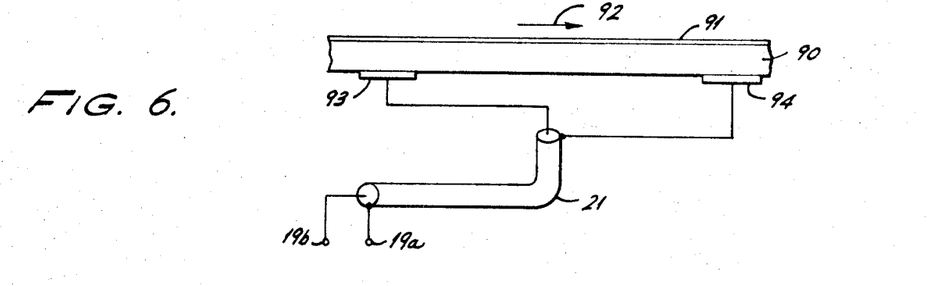
FIG. 6 is a diagram illustrating a further modification of the embodiment of FIG. 1.

To accomplish this, the arrangement shown in FIG. 6 may be substituted for the straight capacitive probe 20 in the system of FIG. 1. In this arrangement the box board 90, with its caly coating 91, is shown moving in the direction indicated by the arrow 92 as it leaves the coating machinery (not shown). Capacitive electrodes 93 and 94 contact the uncoated side of the board at spaced points along its direction of travel and are both connected through coaxial cable 21 to point 19b of the bridge circuit in the arrangement of FIG. 1.

Figure 6A:
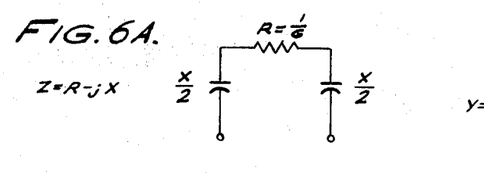
FIGS. 6A and 6B are equivalent circuit diagrams of the modification of FIG. 6.
Figure 6B:
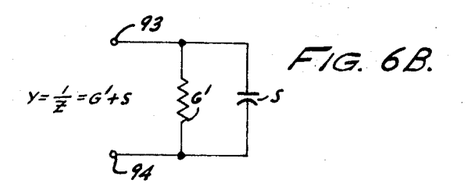

The equivalent circuits of this arrangement are shown in FIGS. 6A and 6B, in which R represents the resistance of the coating between the two points at which the electrodes are located and X represents the total series capacitive reactance of both electrode 93 and 94. Thus the total impedance Z exhibited by the electrodes is $R - jX$ and the admittance may be expressed as $Y = G' + jS$. This is the admittance presented to the bridge circuit at point 19b in FIG. 1, whose conductive and susceptive components are represented by resistor 18 and capacitor 19 in that figure. As demonstrated below, the conductance G of the coating between electrodes 93 and 94 can be expressed in terms of the conductance $G'$ and susceptance S as:

$$G = G' + S^2/G'$$

Thus:

$$Z = R - jX$$
$$Y = 1/Z + 1/(R - jX) \cdot (R + jX)/(R + jX)$$

If $X/R = K$ $$Y = 1(R^2 + K^2R^2) + j\,[KR/(R^2 + K^2R^2)]$$
$$= 1/R \cdot 1/(1 + K^2) + j\,[K/R\,(1 + K^2)]$$
$$= [G/1 + K^2)]j\,[GK/(1 + K^2)]$$
$$= G' + jS$$

Then $$G' = G/(1 + K^2)$$

and $$S = GK/(1 + K^2)$$

(1)

$$G = G'\,(1 + K^2) = G = ]S\,(1 + K^2)/K]$$
$$G' = S/K$$

(2)

From (1) and (2):

$$G = G'\,(1 + K^2)$$
$$= G'\,[1 + (S/G')^2\,]$$
$$= G' + (S^2/G')$$

Figure 7:
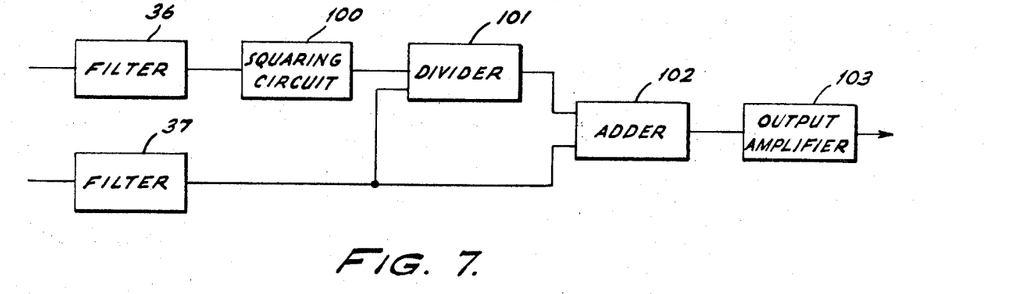
FIG. 7 is a block diagram illustrating a further modification of the embodiemnt of FIG. 1.

To obtain the quantity G in accordance with the expression, the arrangement of FIG. 1 is further modified by substituting the arrangement shown in FIG. 7 for that portion of the FIG. 1 arrangement beginning with an to the right of filters 36 and 37. The output of filter 36. representing the d susceptive component S in the expressio,is supplied to a squaring circuit 100 to produce an output representative of $S^2$ which is supplied to one input of a divider circuit 101. The output of filter 37, representing the conductive component $G'$ is supplied to the other inputof divider 101. The output of divider 101, representative of $S^2/G'$, is supplied to one input of an adder circuit 102, the other input of which is supplied with the output ($G'$) from filter 37.

The output from adder 102 will then represent $G' + S^2/G' = G$, the conductance of the coating on the box board measured between the capacitive electrodes 93 and 94 in FIG. 6. This may be amplified as before in an output amplifier 103, the output of which may be used to control the coating process.

In the arrangement of FIG. 7, the squaring circuit 100 may be of the form shown in the same urr-Brown catalog hereinbefore identified, page 48, upper left. Divider 101 may be of the same form as divider 45 of the FIG. 1 arrangement previously identified.

Another representative application of the invention rlates to the measurement of level of a condcuting material by an immersion probe where the conducting material tends to produce a coating on the probe to a level higher than the actual level of the liquid. Referring to FIG. 8 it is observed that the coating 106 acts like an infinite series string of small resistors between the top of the probe coating and the top of the liquid level, the probe insulation 105 acts like an infinite number of small shunting capacitors. Such a circuit can be represented as a transmission line, where the series impedance per unit length (Z) is dependent upon the coating and the probe configuration, and the shunt admittance per unit length (y) is dependent upon probe insulation and the probe configuration. Since the level measurement is made at radio frequency, a short length of coating (several inches) on the probe will act like an infinitely ling transmission line. The impedance of an infinite transmission line is its characteristic impedance ($Z_c$) which is given by:

$$Z_c = (Z/Y)^{1/2}$$

The series impedance per unit length, z, is merely the coating resistance per unit length:

$$z = R/\alpha = \rho/A,$$

where $\rho$ is the resistivity of the coating and A is the cross-sectional area of the coating.

The shunt admittance per unit length y is the susceptance per unit length of the insulated probe.

$$y = B_c = 1/X_c = j2\pi f C$$

where $f$ is the frequency at which the measurement is made and C is the capacitance per unit length of the probe. Therefore:

$$Z_c = (Z/Y) = (\rho/j2\,\pi fAC)^{1/2}$$

or $$Z_c = (\rho/\pi fAC)^{1/2}\,(1/2 = j/2)$$

Figure 8A:
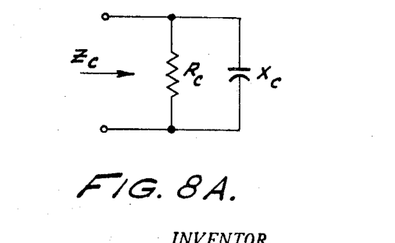
FIG. 8A is an equivalent circuit explanatory of the condition of FIG. 8.

This impedance due to the coating as seen by the instrument can be represented by a parallel circuit as shown in FIG. 8A where the magnitude of $R_c$ is equal to the magnitude of $X_c$:

$$|R_c| = |x_c| = (\rho/\pi fAC)^{1/2}$$

The impedance as seen by the instrument due to the material level on the probe is the capacitive reactance of the length of probe ($l$) which is immersed in the material:

$$X_l = 1/j\,b\,290\,fCl$$

Using the present invention two d.c. signals are developed, one proprtional to probe-to-ground conductance and one proportional to probe-to-ground susceptance. By subtracting one from the other an output which is proportional only to the actual material level is obtained. This is shown as follows:

$$|B| = 1/|X_l|1/|X_c|; \quad |G| = 1/|R_c|$$

Instrument output $\alpha |B| - |G| = 1/|X_c| + 1/|X_c| - 1/|R_c|$

But $|X_c| = |R_c|$

Therefore: Output $\alpha \; 1/|X_c|$

Consequently, for a coating which is long enough to be represented by an infinite transmission line (in most cases a maximim of several inches), the acoting is ignored and the actual material level is measured.

Figure 5B:
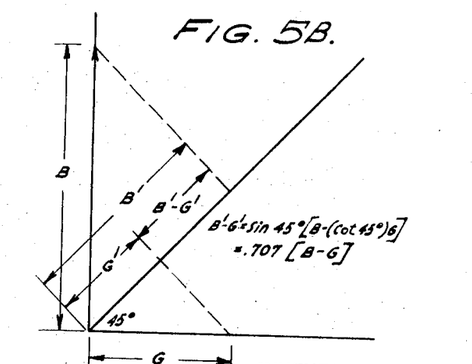

An alternate method of obtaining the same result is to phase the detectot at 45° so that the subtraction is performed at detection and only one detector is required. A vector representation of the detector scheme is shown in FIG. 5B. Taking the vector sum of the htree signals detected, it is seen that the output depends only on the level and is independent of coatings built up on the probe.

While the invention has been described with reference to certain preferred embodiments. it will be apparent that many changes may be made and many widely different embodiments may be constructed without departing from the scope of the invention, which is defined by the following claims:

What is claimed is:

1/ In a system for measuring a first characteristic of a material, an admittance probe adapted for association with said material, means for deriving first and second signals respectively representative only of the susceptive and the conductive components of admittance exhibited by said probe, said susceptive component varying with said first characteristic and also varying with a second characteristic of said material, said conductive component varying only with said second characteristic of said material, and means for combining said first and second signals to yeild a signal primarily representative of variations in said first characteristic and substantially independent of variations in said second characteristic.

2. A system according to claim 1 in which said admittance probe is included in an admittance measuring circuit supplied from a source of high frequency energy, said source comprising a highly stable oscillator and a high gain amplifier provided with high feedback so as to provide a very low impedance output.

3. In a system for measuring the dry weight of a aterial having a variable moisture content, an admittance probe adapted for association with said material, means for deriving first and second signals respectively representative only of the susceptive and the conductive components of admittance exhibited by said rpobe, said susceptive component varying with the weight of said material and also varying with the moisture content thereof, said conductive component varying only with the moisture content of said material, and means for combining said first and second signals to yield a signal primarily representative of variations in weight of said material and substantially independent of variations with moisture content.

4. In a system for measuring the conductivity between spaced points o a coating applied to a relatively non-conductive substrate, a pair of spaced electrodes positioned in proximity to said substrate on the side thereof opposite said coating, means for deriving first and second signals respectively representative only of the susceptive and conductive components of admittance exhibited by said electrodes, and means for operating on said first and second signals to produce a quantity representative of the conductivity of said coating between said spaced electrodes.

5. A system according to claim 4 in which said last means comprises: means for squaring said first signal, means for dividing said squared signal by said second signal, ane means for adding the signal resulting from said division to said second signal to provide a signal representative of said conductivity.

6. A system according to claim 1 in which said combining means comprises means for subtracting said second signal from said first signal.

7. A system according to claim 1 including means for modifying at least one of said signals prior to combination with the other of said signals in a manner to render the variation of both said signals with said second characteristic of substantially the same form.

8. A system according to claim 7 in which said signal modiyfing means comprises a capacitor in series with said probe.

9. A system according to claim 7 in which said signal modification is effected by using an insualted probe.

10. A system according to claim 7 including means for dividing said second signal by said first signal, a function generator for producing a signal which is a predetermined function of the quotient signal produced by said division, means for multiplying said last-named signal by said first signal, and means for subtracting the resultant product signal from said first signal to produce a signal primarily representative of variations in said first characteristic and substantially independent of variations in said second characteristic.

11. A system according to claim 10 in which the signal produced by said function generator is such that, when multiplied by said first signal, the resultant product signal is similar in mathematica' form to said first signal.

12. In a system for measuring a first characteristic of a material, means including an admittance probe adapted for association with said material for deriving a signal having components respectively representative only of the susceptive and conductive components of admittance exhibited by said probe, said susceptive component varying with said first characteristic and also varying with a second characteristic of said material, said conductive component varying only with said second characteristic of said material, and a phase-sensitive detector supplied with said signal and phased to produce an output representative of the difference between said susceptive and conductive components.

13. In a system for measuring a first characteristic of a material, means including a capacitive probe adapted for association with said material for deriving a signal having components respectively representative only of the susceptive and conductive components of admittance exhibited by said probe, said susceptice component varying with said first characteristic and also varying with a second characteristic of said material, said conductve component varying only with said second characteristic of said material, and a phase-sensitive detector supplied with said signal and phased to produce an output representative of the difference between said susceptive component and the product of a constant times the conductive component.

14. In a system for measuring the level of a conducting material in a vessel, an admittance probe adapted for immersion into said material, said material tending to produce a coating on aid probe, means for deriving a signal having components represnetative only of the susceptive and conductive components of admittance exhibited by aid probe, said susceptive component varying with said level and also varying by reason of adherence of said material to said probe when the level of said material changes, said conductive component varying only by reason of said adherence of material to said probe, and a phase snesitive detector supplied with said signal and phased to produce an output representative of the difference between said susceptive and conductive components.

* * * * *